US009331884B2

(12) United States Patent
Hong et al.

(10) Patent No.: US 9,331,884 B2
(45) Date of Patent: May 3, 2016

(54) METHOD AND APPARATUS FOR ENCODING AND DECODING FOR FREQUENCY AND QUADRATURE-AMPLITUDE MODULATION IN WIRELESS COMMUNICATION SYSTEM

(71) Applicant: Samsung Electronics Co., Ltd., Suwon-si, Gyeonggi-do (KR)

(72) Inventors: Sung-Nam Hong, Anyang-si (KR); Min Sagong, Suwon-si (KR); Chi-Woo Lim, Suwon-si (KR); Hyun-Kyu Yu, Suwon-si (KR); Kyung-Whoon Cheun, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 35 days.

(21) Appl. No.: 14/204,060

(22) Filed: Mar. 11, 2014

(65) Prior Publication Data
US 2014/0269992 A1    Sep. 18, 2014

(30) Foreign Application Priority Data

Mar. 12, 2013    (KR) .................. 10-2013-0026376

(51) Int. Cl.
*H04L 27/36*    (2006.01)
*H04L 27/34*    (2006.01)

(52) U.S. Cl.
CPC ................................ *H04L 27/3405* (2013.01)

(58) Field of Classification Search
CPC ......... H04L 27/34; H04L 27/38; H04L 27/32; H04L 27/12; H04L 27/36; H04L 27/3483; H04L 27/10; H04L 27/106; H04L 27/04; H04L 27/06; H04L 27/14; H04L 27/361; H04L 1/0003; H04L 27/362
USPC ......... 375/260, 261, 298, 295, 308, 346, 341; 332/103
See application file for complete search history.

(56) References Cited

U.S. PATENT DOCUMENTS

2004/0131125 A1* 7/2004 Sanderford, Jr. .......... H04L 5/06
375/261
2009/0103509 A1   4/2009 Sanderford, Jr. et al.

FOREIGN PATENT DOCUMENTS

WO    2009-064134 A2    5/2009

OTHER PUBLICATIONS

Asma Latif et al., 'Signal Properties of Hybrid LFSK Modulated MQAM (HQFM) OFDM Transceiver', IJCSNS International Journal of Computer Science and Network Security, vol. 7 No. 11, Nov. 2007 See pp. 72-76; and figures 1(a), 1(b).

(Continued)

*Primary Examiner* — Rahel Guarino
(74) *Attorney, Agent, or Firm* — Jefferson IP Law, LLP

(57) ABSTRACT

An apparatus and a method for operating a transmission end in a wireless communication system that supports Frequency and Quadrature-Amplitude Modulation (FQAM) are provided. The method includes dividing an information bit stream into a plurality of portions, encoding each of the plurality of portions using different encoding schemes, and generating an FQAM symbol by combining result values of the encoding of each of the plurality of portions, wherein the encoding schemes are different according to at least one of an encoding order, an encoding rate, an input size, and an encoding technique.

34 Claims, 13 Drawing Sheets

(56) References Cited

OTHER PUBLICATIONS

Marvin K. Simon et al., 'On the optimality of bit detection of certain digital modulations', IEEE Transactions on Communications, vol. 53 No. 2, Feb. 2005 See pp. 299-307.

Asma Latif et al., 'A Hybrid MQAM-LFSK OFDM Transceiver with Low PAPR', Wireless Communications, Networking and Mobile Computing, Sep. 22-24, 2006 (http://ieeexplore.ieee.org/xpl/login.jsp?tp=&arnumber=4149220) See pp. 1-4.

* cited by examiner

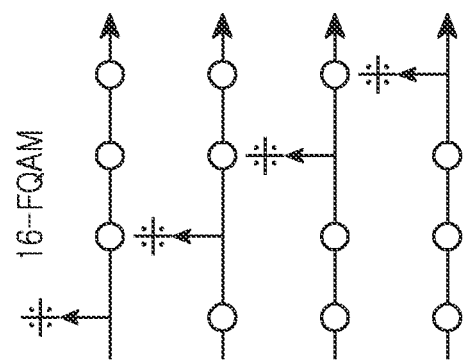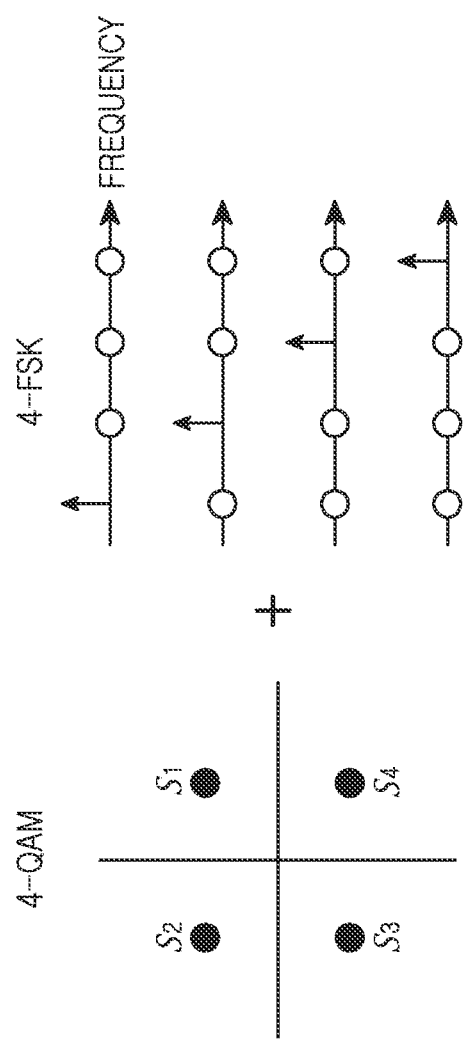

METHOD AND APPARATUS FOR ENCODING AND DECODING FOR FREQUENCY AND QUADRATURE-AMPLITUDE MODULATION IN WIRELESS COMMUNICATION SYSTEM

CROSS-REFERENCE TO RELATED APPLICATION(S)

This application claims the benefit under 35 U.S.C. §119 (a) of a Korean patent application filed on Mar. 12, 2013 in the Korean Intellectual Property Office and assigned Serial number 10-2013-0026376, the entire disclosure of which is hereby incorporated by reference.

TECHNICAL FIELD

The present disclosure relates to encoding and decoding in a wireless communication system.

BACKGROUND

The related art assumes Gaussian distribution with respect to an interference signal in order to perform decoding at low complexity. Therefore, to make a characteristic of an interference signal close to Gaussian maximally, a modulation scheme of a Quadrature Amplitude Modulation (QAM) basis is primarily used. However, it is generally known that a channel capacity of a non-Gaussian channel is greater than that of a Gaussian channel. Therefore, when decoding is properly performed, a higher decoding performance may be obtained in a non-Gaussian channel rather than a Gaussian channel.

Accordingly, development of a modulation scheme allowing an interference signal to conform to the non-Gaussian distribution has been needed, and a modulation scheme proposed as a result of the development is Frequency and Quadrature-Amplitude Modulation (FQAM). The FQAM is a hybrid modulation scheme where the QAM and Frequency Shift Keying (FSK) are combined, and FQAM has both the advantage of a high spectral efficiency of the QAM and the advantage of making an interference signal of the FSK non-Gaussian.

The FQAM has a characteristic of being not suitable for a bit-to-symbol scheme. Therefore, in case of applying the FQAM, a Bit-Interleaved Coded Modulation (BICM) channel capacity is lower than a Coded Modulation (CM) channel capacity. Since, in general, the CM channel capacity increases even more as an alphabet size of a channel code is large, in order to obtain high performance using the FQAM, it is preferable to combine the FQAM with a non-binary channel code where the alphabet size is large. The alphabet size indicates a number of candidates of an encoding output value. At this point, complexity of a non-binary channel code increases exponentially as the alphabet size increases. Therefore, consequently, to use the advantage of the FQAM, channel encoding and decoding processes, whose complex is very high, are needed.

For improvement of a decoding performance, an FQAM technique may be considered, but for an efficient use of the FQAM, channel encoding and decoding processes, whose complexity is high, are needed. Therefore, an alternative for reducing complexity of encoding and decoding while maintaining the advantage of the FQAM needs to be proposed.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and a method for performing encoding and decoding of low complexity for Frequency and Quadrature-Amplitude Modulation (FQAM) in a wireless communication system.

Another aspect of the present disclosure is to provide an apparatus and a method for performing encoding and decoding that approach a Coded Modulation (CM) channel capacity in a wireless communication system that uses an FQAM.

Still another aspect of the present disclosure is to provide an apparatus and a method for performing encoding and decoding that approach a CM channel capacity via low complexity in a wireless communication system that uses an FQAM.

Yet another aspect of the present disclosure is to provide an apparatus and a method for performing a multi-stage encoding and a multi-stage decoding in a wireless communication system that uses an FQAM.

In accordance with an aspect of the present disclosure, a method for operating a transmission end in a wireless communication system that supports FQAM is provided. The method includes dividing an information bit stream into a plurality of portions, encoding each of the plurality of portions using different encoding schemes, and generating an FQAM symbol by combining result values of the encoding of each of the plurality of portions. Herein the encoding schemes are different according to at least one of an encoding order, an encoding rate, an input size, and an encoding technique.

In accordance with another aspect of the present disclosure, a method for operating a reception end in a wireless communication system that supports FQAM is provided. The method includes receiving an FQAM symbol transmitted from a transmission end, decoding each of a plurality of portions of an information bit stream divided by the transmission end using different decoding schemes, and a decoding technique, and determining an information bit stream by combining decoding results of the plurality of portions. Herein the encoding schemes are different according to at least one of an encoding order, an encoding rate, an input size, and an encoding technique.

In accordance with still another aspect of the present disclosure, an apparatus of a transmission end in a wireless communication system that supports FQAM is provided. The apparatus includes a modem configured to divide an information bit stream into a plurality of portions, to encode each of the plurality of portions using different encoding schemes, and to generate an FQAM symbol by combining result values of the encoding of each of the plurality of portions, and a processor configured to transmit the FQAM symbol. Herein the encoding schemes are different according to at least one of an encoding order, an encoding rate, an input size, and an encoding technique.

In accordance with yet another aspect of the present disclosure, an apparatus of a reception end in a wireless communication system that supports FQAM is provided. The apparatus includes a processor configured to receive a signal including an FQAM symbol from a transmission end, and a modem configured to decode each of a plurality of portions of an information bit stream divided by the transmission end respectively using different decoding schemes, and to determine an information bit stream by combining decoding results of the plurality of portions. Herein the encoding schemes are different according to at least one of an encoding order, an encoding rate, an input size, and an encoding technique.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 1A, 1B, and 1C are views illustrating a concept of a Frequency and Quadrature-Amplitude Modulation (FQAM) technique according to an embodiment of the present disclosure;

Throughout the drawings, like reference numerals will be understood to refer to like parts, components and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, the present disclosure describes a technique for performing encoding and decoding of low complexity, for a Frequency and Quadrature-Amplitude Modulation (FQAM) in a wireless communication system.

FIGS. 1A, 1B, and 1C are views illustrating a concept of an FQAM technique according to an embodiment of the present disclosure.

Referring to FIGS. 1A to 1C, an FQAM where a 4-Quadrature Amplitude Modulation (QAM) and a 4-Frequency Shift Keying (FSK) are combined is illustrated. As shown in FIGS. 1A to 1C, the 4-QAM illustrated in FIG. 1A may generate four complex symbols having different phases by having four constellation points in an orthogonal coordinate system. The 4-FSK illustrated in FIG. 1B may generate four complex symbols having different frequency values by using four frequency values. The FQAM illustrated in FIG. 1C is a combination of the 4-QAM and the 4-FSK. As illustrated in FIG. 1C, FQAM symbols may have different four frequency values and four phase values simultaneously, so that 16 symbols may be generated in total.

As described above, the FQAM extends a number of bit streams expressible using only QAM by a number of frequencies. In other words, the FQAM extends the number of bit streams expressible using only FSK by the number of QAM symbols using the phase and the size of an FSK symbol. That is, the FQAM symbol is identified by a combination of the phase and the size of a symbol, and a position on a frequency to which the symbol is mapped.

Figure 2:
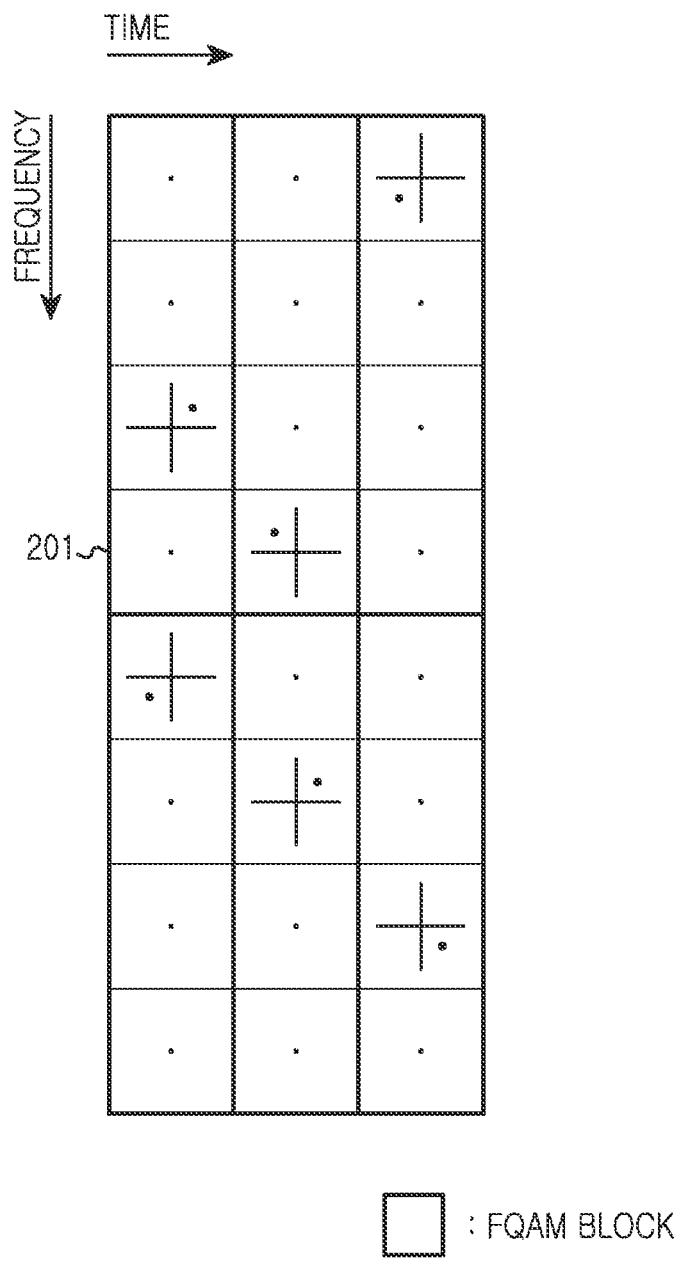
FIG. 2 is a view illustrating an example of signal configuration in a case of applying an FQAM in a wireless communication system according to an embodiment of the present disclosure.

FIG. 2 is a view illustrating an example of signal configuration in a case of applying an FQAM in a wireless communication system according to an embodiment of the present disclosure.

Referring to FIG. 2, a portion of a frame in a case of applying the FQAM to an Orthogonal Frequency Division Multiplexing (OFDM)/Orthogonal Frequency Division Multiple Access (OFDMA) wireless communication system. FIG. 2 exemplarily illustrates a 16-FQAM illustrated in FIGS. 1A to 1C.

As shown in FIG. 2, a horizontal axis represents time and a vertical axis represents a frequency. A division basis of the time axis is a symbol, and a division basis of the frequency axis is a subcarrier. Also, a basis formed of one symbol and one subcarrier is denoted by a tone.

Referring to FIG. 2, one FQAM block includes four tones occupying one symbol and four subcarriers. In FIG. 2, subcarriers included in one FQAM block have been illustrated as adjacent. However, this is only an example and subcarriers included in one FQAM block may not be adjacent, or in other words, may not be continuous physically. Examination of the first block 201 shows that no symbol is mapped to a first tone, a second tone, and a fourth tone from among four tones, and thus, shows a symbol is mapped to a third tone. Also, the symbol mapped to the third tone has a phase value of '1+j'. That is, the FQAM symbol may represent information of four bits via a position on a frequency axis of a tone to which the symbol has been mapped, and a phase value of the symbol itself.

Figure 3:
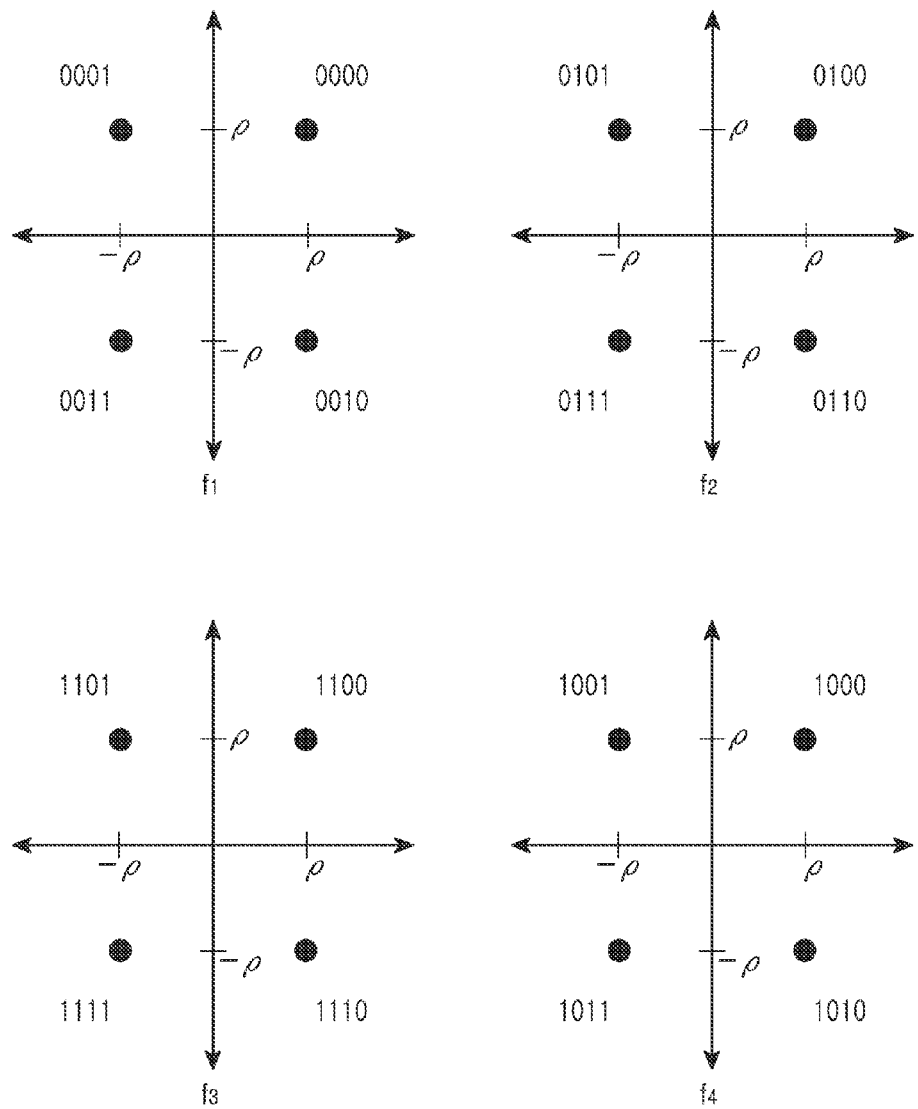
FIG. 3 is a view illustrating an example of mapping between an FQAM symbol and a bit stream in a system according to an embodiment of the present disclosure.

FIG. 3 is a view illustrating an example of mapping between an FQAM symbol and a bit stream in a system according to an embodiment of the present disclosure.

Referring to FIG. 3, which exemplarily illustrates a 16-FQAM, in a frequency $f_1$, a QAM symbol of a value $\rho+j\rho$ is mapped to 0000, a QAM symbol of a value $-\rho+j\rho$ is mapped to 0001, a QAM symbol of $\rho-j\rho$ is mapped to 0010, and a QAM symbol of $-\rho-j\rho$ is mapped to 0011. Also, in a frequency $f_2$, a QAM symbol of a value $\rho+j\rho$ is mapped to 0100, a QAM symbol of a value $-\rho+j\rho$ is mapped to 0101, a QAM symbol of $\rho-j\rho$ is mapped to 0110, and a QAM symbol of $-\rho-j\rho$ is mapped to 0111. Also, in a frequency $f_3$, a QAM symbol of a value $\rho+j\rho$ is mapped to 1100, a QAM symbol of a value $-\rho+j\rho$ is mapped to 1101, a QAM symbol of $\rho-j\rho$ is mapped to 1110, and a QAM symbol of $-\rho-j\rho$ is mapped to 1111. Also, in a frequency $f_4$, a QAM symbol of a value $\rho+j\rho$ is mapped to 1000, a QAM symbol of a value $-\rho+j\rho$ is mapped to 1001, a QAM symbol of $\rho-j\rho$ is mapped to 1010, and a QAM symbol of $-\rho-j\rho$ is mapped to 1011.

That is, in an entire bit stream, bits of a QAM portion and bits of an FSK portion exist independently. In the embodiment of FIG. 3, two Most Significant Bits (MSB) are bits of the FSK portion, and two Least Significant Bits (LSB) are bits of a QAM portion. Generally, since energy per bit is fixed, a QAM symbol of the FQAM symbol has energy per symbol greater than an ordinary QAM symbol of a same order. This is because energy of FSK bits of an FQAM symbol is added to a QAM symbol. Therefore, when an FSK portion is successfully detected and/or decoded from an FQAM, a probability of detecting and/or decoding a QAM portion successfully may be very high. With consideration of the characteristic of the FQAM, the present disclosure proposes the encoding and decoding structure illustrated in FIG. 4.

Figure 4:
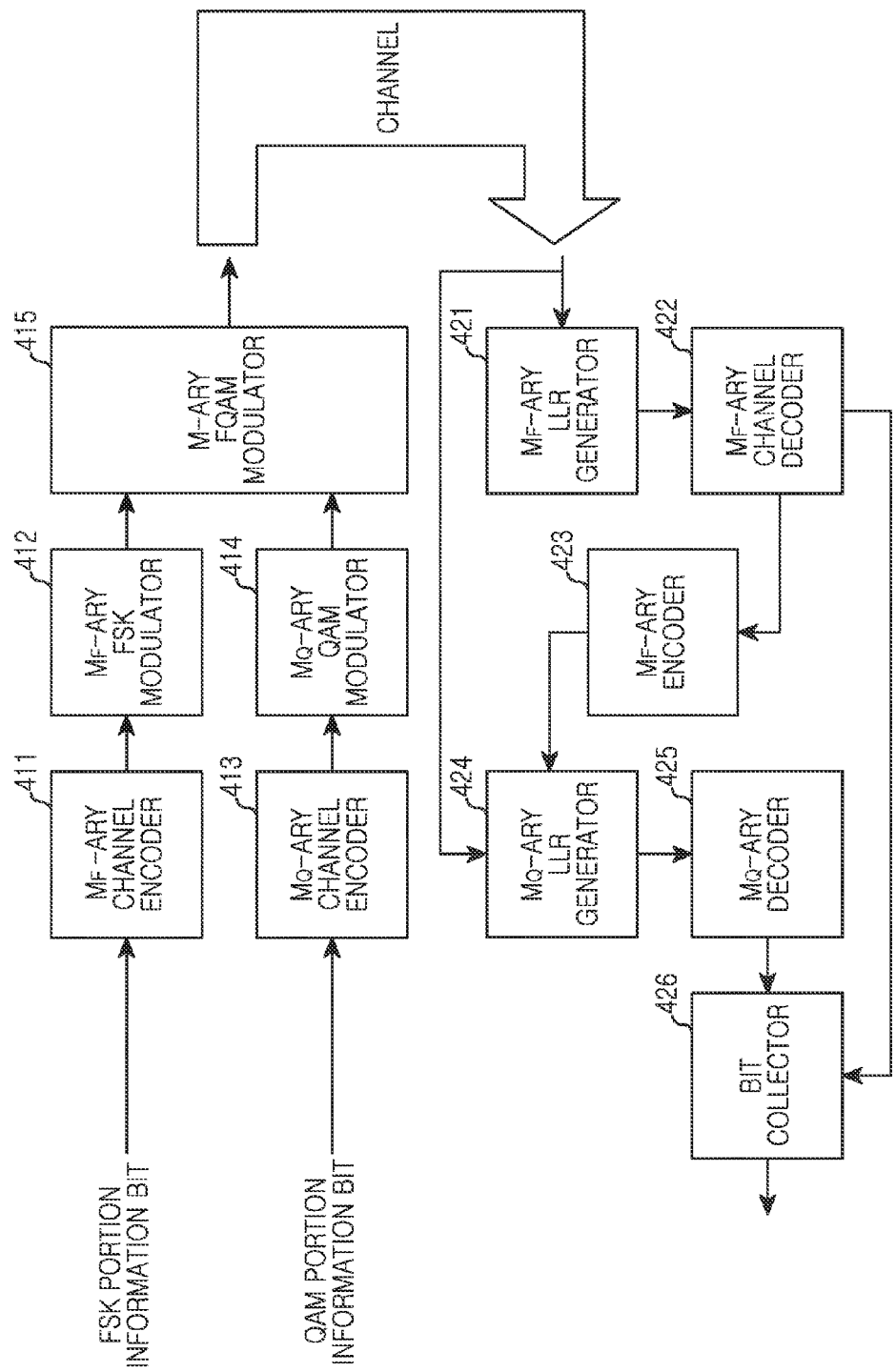
FIG. 4 is a conceptual view illustrating an encoding and decoding structure in a system according to an embodiment of the present disclosure.

FIG. 4 conceptually illustrates an encoding and decoding structure in a system according to an embodiment of the present disclosure.

Referring to FIG. 4, a transmission end performs encoding on an FSK symbol of an FQAM symbol using a strong code, and encodes a QAM symbol using a code whose decoding process is simple. Therefore, a decoding performance is maintained, and decoding complexity may be reduced. The strong code applied to the FSK symbol may be at least one of a channel code whose alphabet size is large, a channel code whose frame size is large, and a channel code whose code rate is low. That is, the transmission end divides an entire information bit stream, and performs first encoding and second encoding of different orders on each portion. In response thereto, the reception end performs a multi-stage decoding of an FSK portion first, and then decoding of a QAM portion using the decoded information.

Specifically, the transmission end includes an $M_F$-ary channel encoder 411, an $M_F$-ary FSK modulator 412, an $M_Q$-ary channel encoder 413, an $M_Q$-ary QAM modulator 414, and an M-ary FQAM modulator 415. Transmission bits are divided into FSK portion information bits and QAM portion information bits. Also, the FSK portion information bits are input to the $M_F$-ary channel encoder 411. The $M_F$-ary channel encoder 411 performs encoding whose order is $M_F$.

Also, the $M_F$-ary FSK modulator 412 performs FSK modulation to generate an FSK symbol. The QAM portion information bits are input to the $M_Q$-ary channel encoder 413. The $M_Q$-ary channel encoder 413 performs encoding whose order is $M_Q$ to generate a QAM symbol. Also, the $M_Q$-ary QAM modulator 414 performs QAM modulation. After that, the M-ary FQAM modulator 415 generates an M-ary FQAM symbol by combining the FSK symbol and the QAM symbol. That is, the M-ary FQAM modulator 415 generates an M-ary FQAM symbol by combining $M_F$-ary symbol, which is an output of an $M_F$-ary encoding, and an $M_Q$-ary symbol, which is an output of $M_Q$-ary encoding. Here, M is the same as product of $M_F$ and $M_Q$.

The reception end includes an $M_F$-ary Log-Likelihood Ratio (LLR) generator 421, an $M_F$-ary channel decoder 422, an $M_F$-ary encoder 423, an $M_Q$-ary LLR generator 424, an $M_Q$-ary decoder 425, and a bit collector 426. A reception signal is input to the $M_F$-ary LLR generator 421 and the $M_Q$-ary LLR generator 424. The $M_F$-ary LLR generator 421 determines a Log-Likelihood (LL) vector of an $M_F$-ary symbol from a received M-ary FQAM symbol. The $M_F$-ary channel decoder 422 performs $M_F$-ary decoding, and provides the decoding result to the $M_F$-ary encoder 423 and the bit collector 426. At this point, the decoding result provided to the $M_F$-ary encoder 423 is for generating an LL vector of the $M_Q$-ary LLR generator 424, and may conform to a hard decision method or a soft decision method. The $M_F$-ary encoder 423 performs $M_F$-ary encoding on the decoding result of the $M_F$-ary channel decoder 422 again, and provides the encoding result to the $M_Q$-ary LLR generator 424. An output of the $M_F$-ary encoder 423 represents only an $M_F$-ary systematic symbol. Therefore, the $M_F$-ary encoder 423 additionally generates an $M_F$-ary parity symbol, and combines a systematic symbol and a parity symbol to provide the same to the $M_Q$-ary LLR generator 424. However, in a case of being able to immediately generate an $M_F$-ary parity symbol from a decoding output, as in a Low Density Parity Code (LDPC), the $M_F$-ary encoder 423 may be omitted. The $M_Q$-ary LLR generator 424 determines an LL vector of an $M_Q$-ary symbol using the re-encoded $M_F$-ary code value and the received FQAM symbol. Also, the $M_Q$-ary decoder 425 performs $M_Q$-ary decoding. After that, the bit collector 426 recovers an information bit stream by combining an output of the $M_F$-ary channel decoder 422 and an output of the $M_Q$-ary decoder 425.

In the embodiment illustrated in FIG. 4, encoding and decoding are formed of two stages. According to another embodiment of the present disclosure, the encoding and decoding may be formed of three or more stages.

Figure 5:
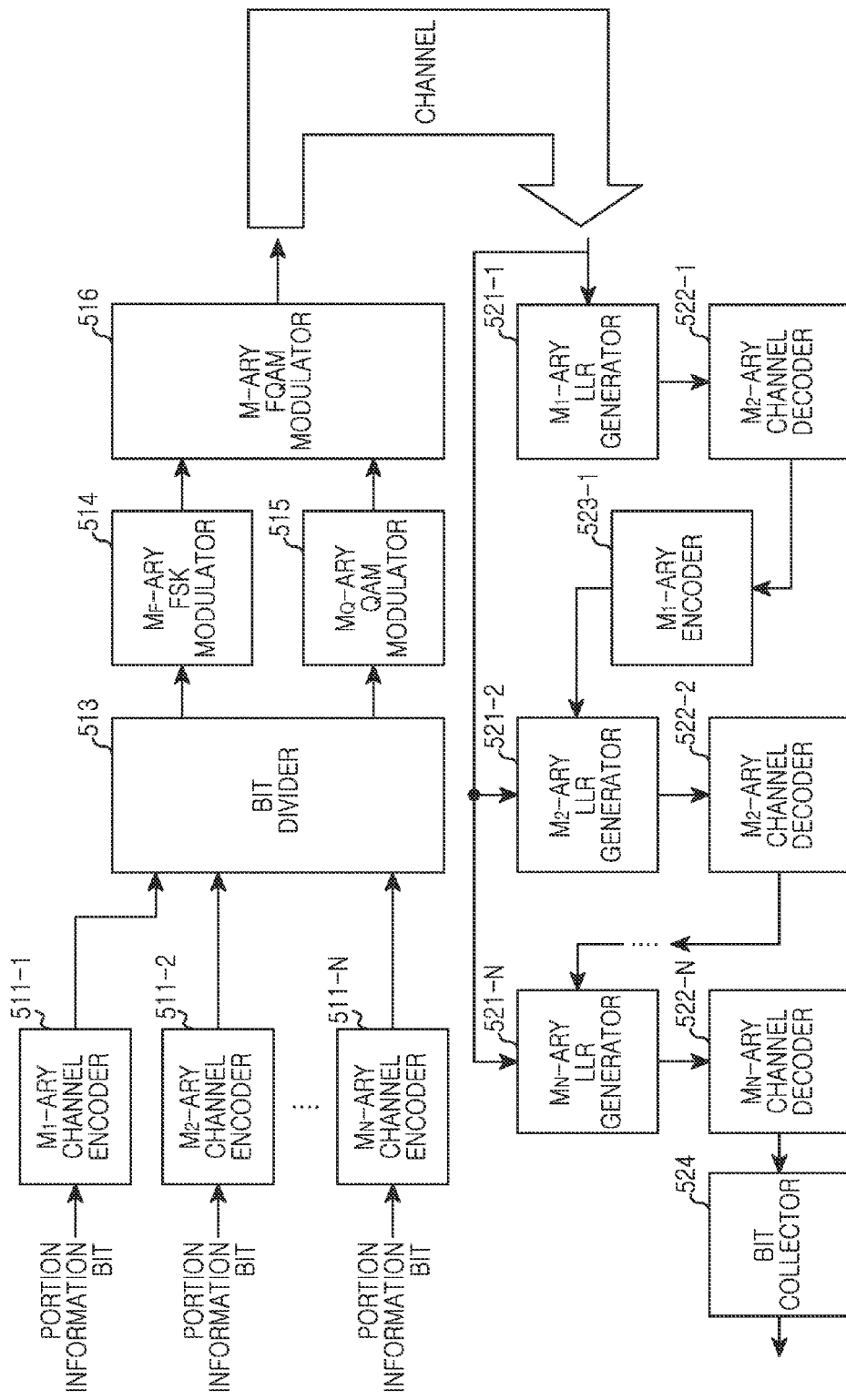
FIG. 5 is a conceptual view illustrating an encoding and decoding structure in a system according to an embodiment of the present disclosure.

FIG. 5 is a conceptual view illustrating an encoding and decoding structure in a system according to an embodiment of the present disclosure.

Referring to FIG. 5, a transmission end includes N $M_N$-ary channel encoders 511-1 to 511-N. Here, N is three or more. Each of the N $M_N$-ary channel encoders 511-1 to 511-N receives a relevant portion of information bits, and performs encoding according to a relevant order $M_n$. Also, the N $M_N$-ary channel encoders 511-1 to 511-N provide encoded bits to a bit divider 513. The bit divider 513 divides an encoded bit to bits for FSK modulation and bits for QAM modulation, and provides the divided bits to an $M_F$-ary FSK modulator 514 and an $M_Q$-ary QAM modulator 515. The $M_F$-ary FSK modulator 514 performs FSK modulation to generate an FSK symbol, and the $M_Q$-ary QAM modulator 515 performs QAM modulation. After that, an M-ary FQAM modulator 516 generates an M-ary FQAM symbol by combining the FSK symbol and the QAM symbol. Here, M is the same as a product of $M_F$ and $M_Q$.

The reception end includes N $M_N$-ary LLR generators 521-1 to 521-N, N $M_N$-ary channel decoders 522-1 to 522-N, and (N−1) $M_N$-ary encoders 523-1 to 523-N−1, wherein $M_N$-ary encoder 523-N−1 is not shown. Here, N is three or more. A reception signal is input to each of the $M_N$-ary LLR generators 521-1 to 521-N. The $M_1$-ary LLR generator 521-1 determines an LL vector of an $M_1$-ary symbol from a received M-ary FQAM symbol. The $M_1$-ary channel decoder 522-1 performs $M_1$-ary decoding, and provides the decoding result to the $M_1$-ary encoder 523-1 and a bit collector 524. At this point, the $M_1$-ary encoder 523-1 encodes a decoding result of the $M_1$-ary channel decoder 522-1 again, and provides the encoding result to the M2-ary LLR generator 521-2 of the next stage. After that, a similar process is repeated in each stage. A bit collector 524 recovers an information bit stream by combining outputs of the $M_N$-ary channel decoders 522-1 to 522-N.

In the embodiments of FIGS. 4 and 5, encoding and decoding are formed of a plurality of stages having different orders. However, according to an embodiment of the present disclosure, each stage of the encoding and the decoding may have a different code rate, rather than having different orders. Also, according to an embodiment of the present disclosure, each stage of the encoding and the decoding may have a different encoding input size, rather than having different orders. According to an embodiment of the present disclosure, each stage of the encoding and the decoding may use a different encoding/decoding technique, rather than having different orders. For example, one of the encoding/decoding may use a turbo code, and the other may use an LDPC.

That is, a transmission end according to an embodiment of the present disclosure performs encoding using a plurality of stages. The stages of the encoding may be divided into at least one of an order, an encoding rate, an input size, and an encoding technique. Also, a reception end according to an embodiment of the present disclosure performs decoding using a plurality of stages, and the stages of the decoding may be divided into at least one of an order, an encoding rate, an input size of corresponding encoding, and a decoding technique.

The performance of the FQAM may be improved via optimization of a mapping rule between an FQAM symbol and a bit stream. In the mapping rule illustrated in FIG. 3, relation between inter-symbol distance and a changing bit is not optimized. Therefore, the present disclosure further proposes a mapping rule illustrated in FIG. 6.

Figure 6:
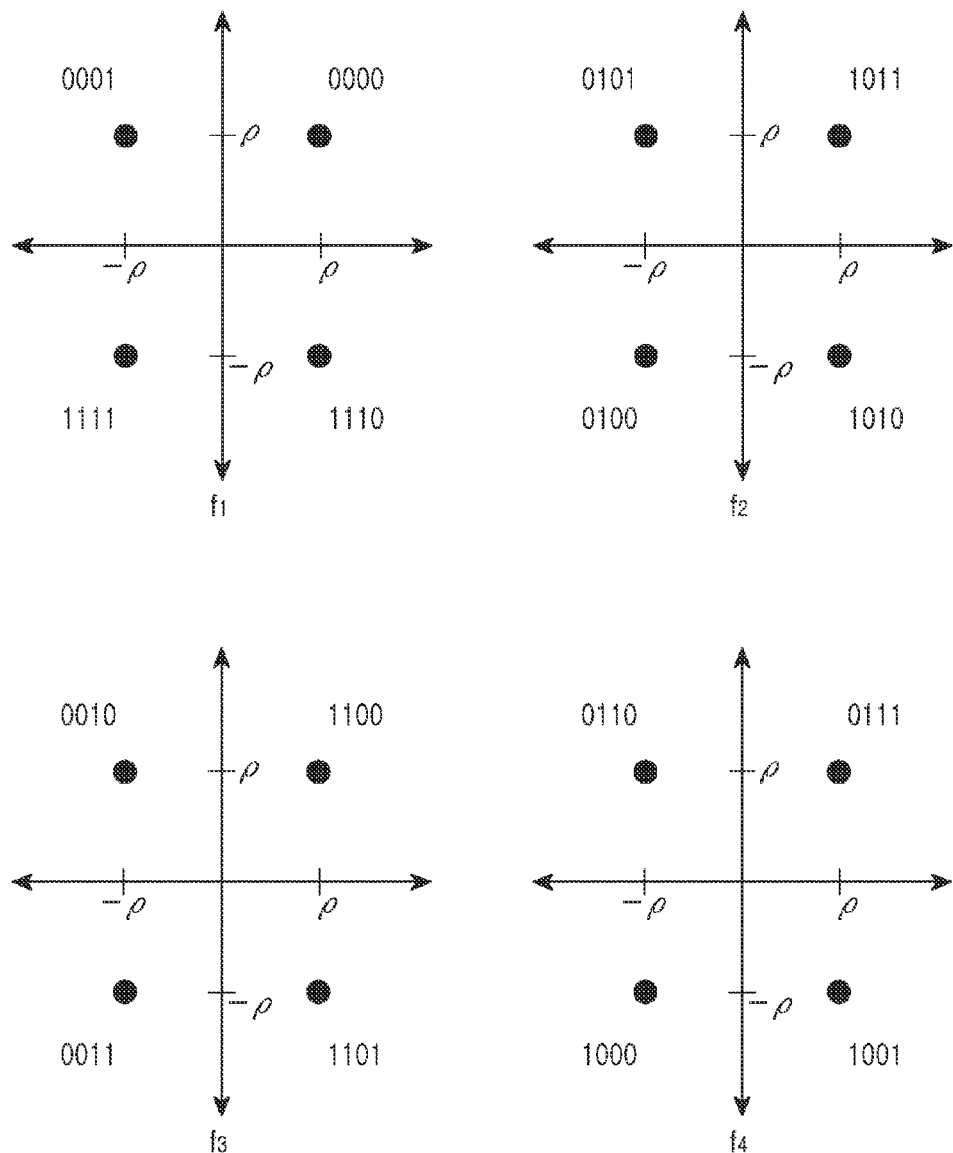
FIG. 6 is a view illustrating an example of mapping between an FQAM symbol and a bit stream in a system according to an embodiment of the present disclosure.

FIG. 6 is a view illustrating an example of mapping between an FQAM symbol and a bit stream in a system according to an embodiment of the present disclosure. FIG. 6 exemplarily illustrates a 16-FQAM.

Referring to FIG. 6, in a frequency $f_1$, a QAM symbol of a value $\rho+j\rho$ is mapped to 0000, a QAM symbol of a value $-\rho+j\rho$ is mapped to 0001, a QAM symbol of $\rho-j\rho$ is mapped to 1110, and a QAM symbol of $-\rho-j\rho$ is mapped to 1111. Also, in a frequency $f_2$, a QAM symbol of a value $\rho+j\rho$ is mapped to 1011, a QAM symbol of a value $-\rho+j\rho$ is mapped to 0101, a QAM symbol of $\rho-j\rho$ is mapped to 1010, and a QAM symbol of $-\rho-j\rho$ is mapped to 0100. Also, in a frequency $f_3$, a QAM symbol of a value $\rho+j\rho$ is mapped to 1100, a QAM symbol of a value $-\rho+j\rho$ is mapped to 0010, a QAM symbol of $\rho-j\rho$ is mapped to 1101, and a QAM symbol of $-\rho-j\rho$ is mapped to 0011. Also, in a frequency $f_4$, a QAM symbol of a value $\rho+j\rho$ is mapped to 0111, a QAM symbol of a value $-\rho+j\rho$ is mapped to 0110, a QAM symbol of $\rho-j\rho$ is mapped to 1001, and a QAM symbol of $-\rho-j\rho$ is mapped to 1000.

That is, even in case of being mapped to the same frequency, two MSB bits may be different. That is, an entire bit stream is not divided into an FSK portion and a QAM portion. Therefore, in a case of applying the mapping rule of FIG. 6, the encoding and decoding structure illustrated in FIG. 4 cannot be applied. Therefore, in the case where the mapping rule of FIG. 6 is used, the present disclosure proposes the encoding and decoding structure of FIG. 7.

Figure 7:
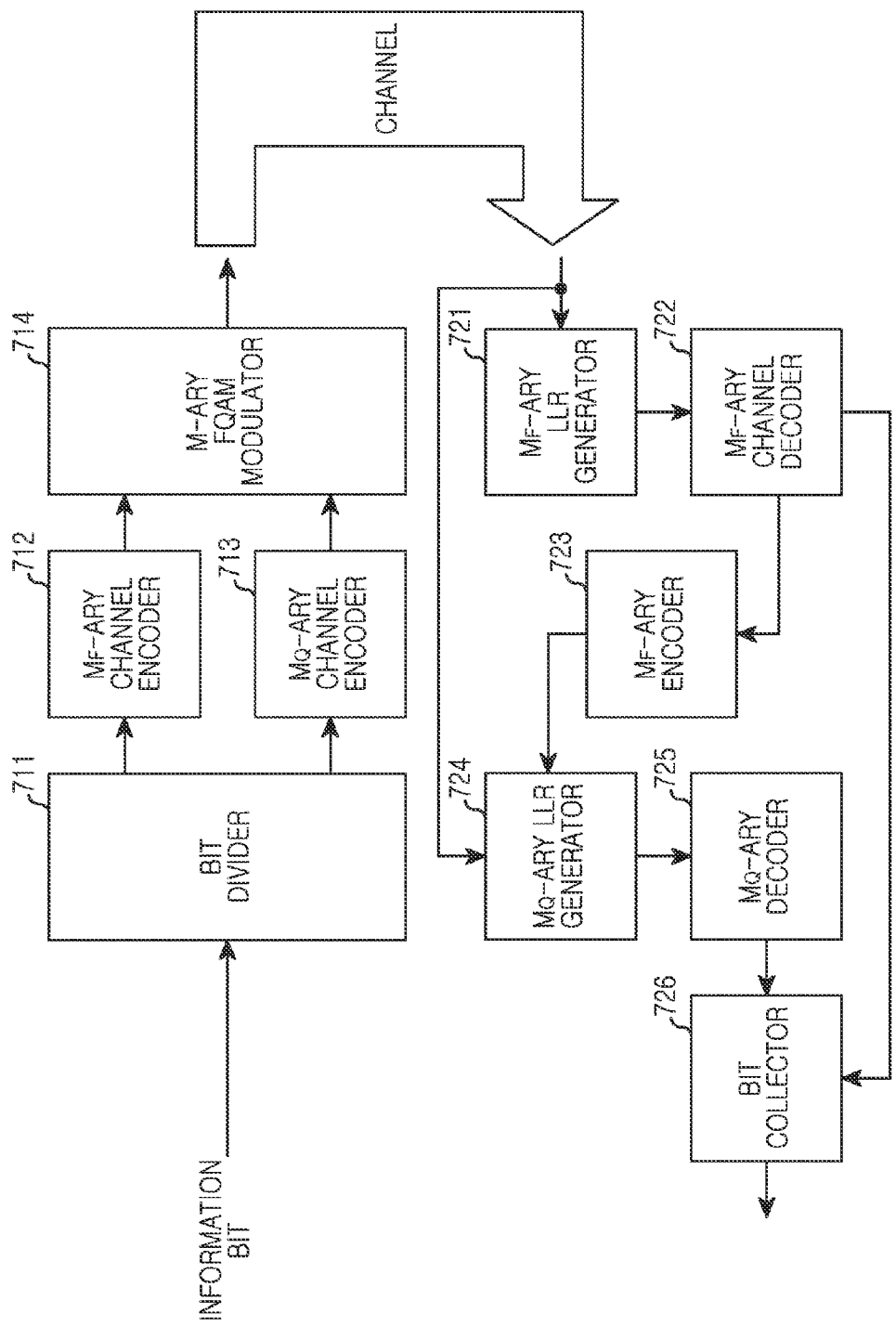
FIG. 7 is a conceptual view illustrating an encoding and decoding structure in a system according to an embodiment of the present disclosure.

FIG. 7 is a conceptual view illustrating an encoding and decoding structure in a system according to an embodiment of the present disclosure.

In a case of a non-binary encoded FQAM, a decoding performance improves as an alphabet size increases. However, as the alphabet size increases, a performance improvement degree by an alphabet size increase reduces gradually. Using this characteristic, a transmission end, according to an embodiment of the present disclosure, divides bits for a symbol into a first portion of $\log_2 M_F$ bits and a second portion of $\log_2 M_Q$ bits, and then encodes the first portion using an $M_F$-ary channel code and encodes the second portion using an $M_Q$-ary channel code as illustrated in FIG. 7. That is, the transmission end divides an entire information bit stream, and performs first decoding and second decoding of a different order on each portion. For example, $M_F$ may be M/2, and $M_Q$ may be 2. In response thereto, the reception end performs multi-stage decoding of the first portion encoded via first encoding first, and then performs decoding of the second portion using the decoded first portion.

Specifically, the transmission end includes a bit divider 711, an $M_F$-ary channel encoder 712, an $M_Q$-ary channel encoder 713, and an M-ary FQAM modulator 714. The bit divider 711 divides an input information bit stream in a ratio of $\log_2 M_Q : \log_2 M_F$. A first bit portion bit stream, corresponding to $\log_2 M_F$, is input to the $M_F$-ary channel encoder 712, and a second bit portion bit stream, corresponding to $\log_2 M_Q$, is input to the $M_Q$-ary channel encoder 713. The $M_F$-ary channel encoder 712 performs $M_F$-ary encoding on the first portion bit stream, and the $M_Q$-ary channel encoder 713 performs $M_Q$-ary encoding on the second portion bit stream. Also, the M-ary FQAM modulator 714 generates an M-ary FQAM symbol using encoded bits.

The reception end includes an $M_F$-ary LLR generator 721, an $M_F$-ary channel decoder 722, an $M_F$-ary encoder 723, an $M_Q$-ary LLR generator 724, an $M_Q$-ary decoder 725, and a bit collector 726. A reception signal is input to the $M_F$-ary LLR generator 721 and the $M_Q$-ary LLR generator 724. The $M_F$-ary LLR generator 721 determines an LL vector of an $M_F$-ary symbol from a received M-ary FQAM symbol. The $M_F$-ary channel decoder 722 performs $M_F$-ary decoding, and provides the decoding result to the $M_F$-ary encoder 723 and the bit collector 726. At this point, the decoding result provided to the $M_F$-ary encoder 723 is for generating an LL vector of the $M_Q$-ary LLR generator 724, and may conform to a hard decision method or a soft decision method. The $M_F$-ary encoder 723 performs $M_F$-ary encoding on the decoding result of the $M_F$-ary channel decoder 722 again, and provides the encoding result to the $M_Q$-ary LLR generator 724. An output of the $M_F$-ary encoder 723 represents only an $M_Q$-ary systematic symbol. Therefore, the $M_F$-ary encoder 723 additionally generates an $M_F$-ary parity symbol, and combines a systematic symbol and a parity symbol to provide the same to the $M_Q$-ary LLR generator 724. However, in a case of being able to immediately generate an $M_F$-ary parity symbol from a decoding output, as in a LDPC, the $M_F$-ary encoder 723 may be omitted. The $M_Q$-ary LLR generator 724 determines an LL vector of an $M_F$-ary symbol using the re-encoded $M_F$-ary code value and the received FQAM symbol. Also, the $M_Q$-ary decoder 725 performs $M_F$-ary decoding. After that, the bit collector 726 recovers an information bit stream by combining an output of the $M_F$-ary channel decoder 722 and an output of the $M_Q$-ary decoder 725.

In the embodiment illustrated in FIG. 7, encoding and decoding are formed of two stages. According to an embodiment of the present disclosure, the encoding and decoding may be formed of three or more stages.

Figure 8:
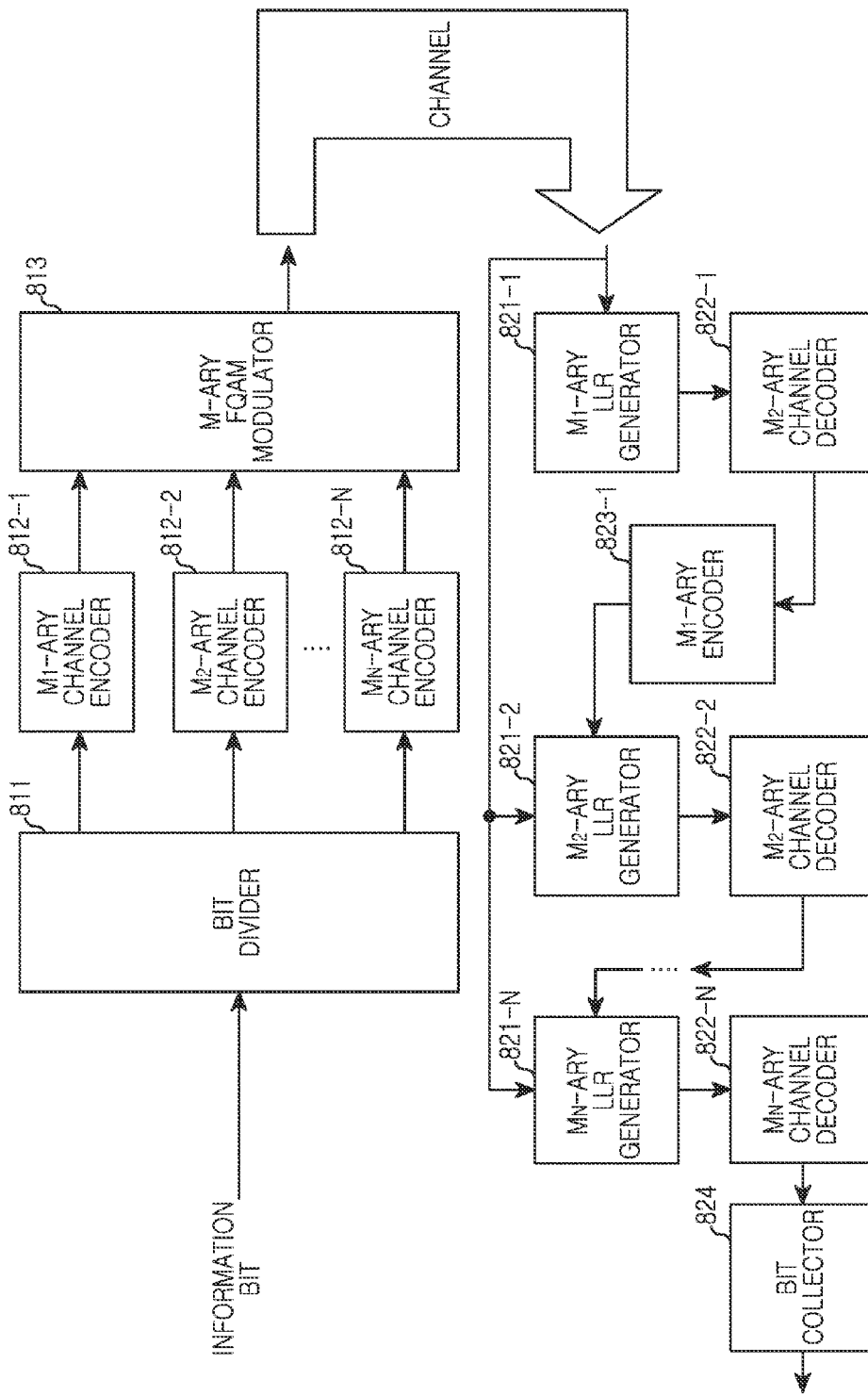
FIG. 8 is a conceptual view illustrating an encoding and decoding structure in a system according to an embodiment of the present disclosure.

FIG. 8 is a conceptual view illustrating an encoding and decoding structure in a system according to an embodiment of the present disclosure.

Referring to FIG. 8, a transmission end includes N $M_N$-ary channel encoders 812-1 to 812-N. Here, N is three or more. Each of the N $M_N$-ary channel encoders 812-1 to 812-N receives a relevant portion of information bits, and performs encoding according to a relevant order $M_n$. Also, the N $M_N$-ary channel encoders 812-1 to 812-N provide encoded bits to an M-ary FQAM modulator 813. After that, the M-ary FQAM modulator 813 generates an M-ary FQAM symbol using the encoded bits.

The reception end includes N $M_N$-ary LLR generators 821-1 to 821-N, N $M_N$-ary channel decoders 822-1 to 822-N, and (N−1) $M_N$-ary channel encoders 823-1 to 823-N−1, wherein $M_N$-ary encoder 823-N−1 is not shown. Here, N is three or more. A reception signal is input to each of the $M_N$-ary LLR generators 821-1 to 821-N. An $M_1$-ary LLR generator 821-1 determines an LL vector of an $M_1$-ary symbol from a received M-ary FQAM symbol. The $M_1$-ary channel decoder 822-1 performs $M_1$-ary decoding, and provides the decoding result to the $M_1$-ary channel encoder 823-1 and a bit collector 824. At this point, the $M_1$-ary channel encoder 823-1 performs $M_1$-ary encoding on the decoding result of the $M_1$-ary channel decoder 822-1 again, and provides the encoding result to the $M_2$-ary LLR generator 821-2 of the next stage. After that, a similar process is repeated in each stage. The bit collector 824 recovers an information bit stream by combining outputs of the encoders 822-1 to 822-N.

In the embodiments of FIGS. 7 and 8, encoding and decoding are formed of a plurality of stages having different orders. However, according to an embodiment of the present disclosure, each stage of the encoding and the decoding may have a different code rate, rather than having different orders. Also, according an embodiment of the present disclosure, each stage of the encoding and the decoding may have a different encoding input size, rather than having different orders. According to an embodiment of the present disclosure, each stage of the encoding and the decoding may use a different encoding/decoding technique, rather than having different orders. For example, one of the encoding/decoding may use a turbo code, and the other may use an LDPC.

That is, a transmission end, according to an embodiment of the present disclosure, performs encoding using a plurality of stages. The stages of the encoding may be divided into at least one of an order, an encoding rate, an input size, and an encoding technique. Also, a reception end, according to an embodiment of the present disclosure, performs decoding using a plurality of stages, and stages of the decoding may be divided into at least one of an order, an encoding rate, an input size of corresponding encoding, and a decoding technique.

A decoding process of a reception end, described with reference to FIGS. 4, 5, 7, and 8, includes an LL vector determination process. Here, the LL vector may be determined as described below. Hereinafter, a case where two-stage encoding and decoding are performed, as illustrated in FIGS. 4 and 7, is described.

The $M_F$-ary LLR generator 421 of FIG. 4 and the $M_F$-ary LLR generator 721 of FIG. 7 generate an LL vector as in Equation (1) below.

$$L_k^{M_F}(Y[k], H[k]) = (\begin{matrix} L_1 & L_2 & \ldots & L_{M_F} \end{matrix}) \quad \text{Equation (1)}$$

where $$\begin{cases} L_b = \ln\left\{\sum_{l=1}^{M_Q} f_{Y[k]}(y[k] \mid H[k], x = \{m_b, s_l\}) - \right\} \\ C_{M_F} = \{m_1, \ldots, m_{M_F}\} \\ C_{M_Q} = \{s_1, \ldots, s_{M_Q}\} \end{cases}$$

In Equation (1), $L_k^{M_F}$ is an LL vector of a length $M_F$ regarding a k-th FQAM symbol, $M_F$ is the order of a first encoding, Y[k] is a reception signal regarding a k-th FQAM symbol, H[k] is a channel coefficient vector regarding the k-th FQAM symbol, $L_b$ is an LL value regarding a b-th symbol candidate, $M_Q$ is the order of a second encoding, $m_b$ is a b-th symbol among an $M_F$-ary symbol set of the first encoding, $S_1$ is an 1-th symbol from among an $M_Q$-ary symbol set of the second encoding, $C_{M_F}$ is the $M_F$-ary symbol set of the first encoding, and $C_{M_Q}$ is the $M_Q$-ary symbol set of the second encoding.

The $M_Q$-ary LLR generator 424 of FIG. 4 and the $M_Q$-ary LLR generator 724 generate an LL vector as in Equation (2) below.

$$L_k^{M_Q}(Y[k], H[k]) = (L_1 L_2 \ldots L_{M_Q})$$

where $L_b = \ln\{f_{Y[k]}(y[k]|H[k], x=\{\hat{m}_k, s_b\})\}$ \quad Equation (2)

In Equation (2), $L_k^{M_Q}$ is an LL vector of a length $M_Q$ regarding a k-th FQAM symbol, $M_Q$ is the order of the second encoding, Y[k] is a reception signal regarding a k-th FQAM symbol, H[k] is a channel coefficient vector regarding the k-th FQAM symbol, $L_b$ is an LL value regarding a b-th symbol candidate, $\hat{m}_k$ is a result value of the first encoding generated by re-encoding a result of a first decoding, and $S_b$ is a b-th symbol among an $M_Q$-ary symbol set of the second encoding.

That is, in generating an LLR, the reception end generates an LL vector representing probabilities regarding each candidate symbol. Also, the reception end generates an LL vector that considers only the first encoding, and an LL vector that considers only the second encoding. For example, the reception end calculates a magnitude of an interference and a noise by subtracting a candidate symbol value from a reception signal value, and determines probability that an interference and a noise of a magnitude calculated from a probability density function (pdf) of an interference and a noise occur, thereby calculating a probability regarding the candidate symbol.

When generating the LL vector that considers only the first encoding, the reception end sums probabilities regarding symbol candidates having a same result value of the first encoding and different result values of the second encoding. For example, according to the mapping rule of FIG. 3, when two MSBs are determined via the first encoding, the LL vector that considers only the first encoding includes a sum of a probability that a symbol of '0000' is to be transmitted, a probability that a symbol of '0001' is to be transmitted, a probability that a symbol of '0010' is to be transmitted, a probability that a symbol of '0011' is to be transmitted, as a probability that a result value of the first encoding is '00', and sum of a probability that a symbol of '0100' is to be transmitted, a probability that a symbol of '0101' is to be transmitted, a probability that a symbol of '0110' is to be transmitted, a probability that a symbol of '0111' is to be transmitted, as a probability that a result value of the first encoding is '01', and sum of a probability that a symbol of '1100' is to be transmitted, a probability that a symbol of '1101' is to be transmitted, a probability that a symbol of '1110' is to be transmitted, a probability that a symbol of '1110' is to be transmitted, as a probability that a result value of the first encoding is '11', and sum of a probability that a symbol of '1000' is to be transmitted, a probability that a symbol of '1001' is to be transmitted, a probability that a symbol of '1010' is to be transmitted, a probability that a symbol of '1011' is to be transmitted, as a probability that a result value of the first encoding is '10'.

Also, when generating an LL vector that considers only the second encoding, on the premise of a result value generated via re-encoding of a first portion, the reception end calculates a probability regarding symbol candidates having different second encoding result values. For example, according to the mapping rule of FIG. 3, when a result value of the first encoding is determined as '11', the LL vector that considers only the second encoding includes a probability that a symbol of '1100' is to be transmitted, a probability that a symbol of '1101' is to be transmitted, a probability that a symbol of '1110' is to be transmitted, and a probability that a symbol of '1111' is to be transmitted.

Hereinafter, an operation and a construction of the reception end that generates a decoding metric will be described with reference to the drawings.

Figure 9:
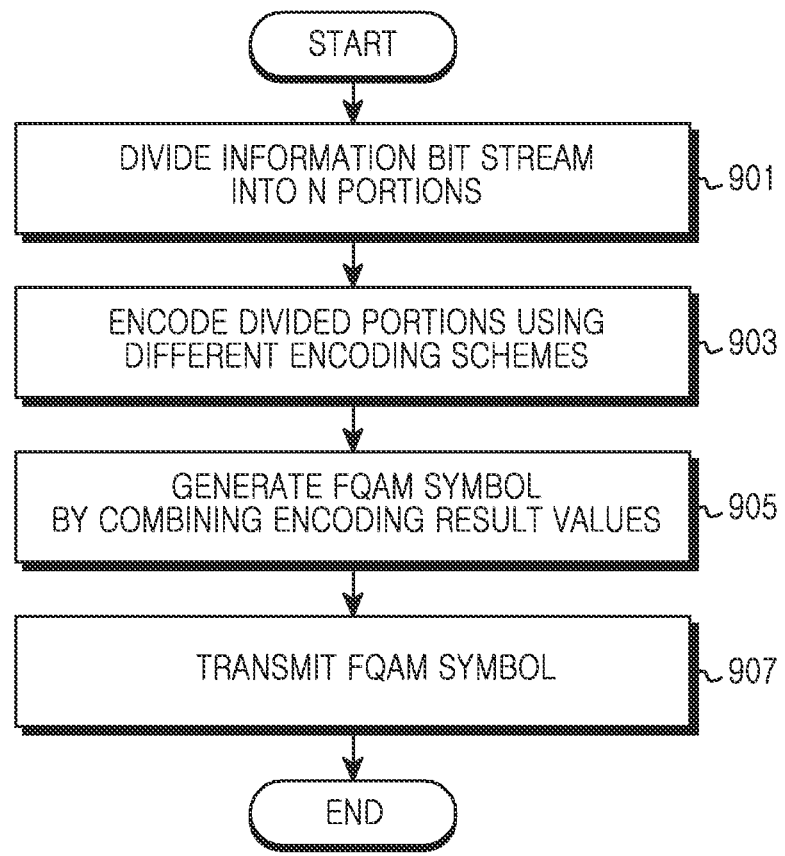
FIG. 9 is a flowchart illustrating an operating procedure of a transmission end in a wireless communication system according to an embodiment of the present disclosure.

FIG. 9 is a flowchart illustrating an operating procedure of a transmission end in a wireless communication system according to an embodiment of the present disclosure.

Referring to FIG. 9, the transmission end divides an information bit stream into N portions in operation 901. Here, N is an integer equal to or greater than 2. According to an embodiment of the present disclosure, the transmission end may divide the information bit stream into a first portion transmitted via an FSK symbol and a second portion transmitted via a QAM symbol. According to another embodiment of the present disclosure, the information may be divided in a predefined ratio regardless of an FSK symbol and a QAM symbol.

The transmission end proceeds to operation 903 to encode the divided portions, which are the N respective portions, using different encoding methods. Here, the encoding methods may be classified, and/or distinguished, according to at least one of an encoding order, an encoding rate, an input size, and an encoding technique. In a case where the information bit stream is divided into two portions, according to an embodiment of the present disclosure, the transmission end may encode the first portion using a first encoding method of a same order as an FSK modulation order, and may encode the second portion using a second encoding method of a same order as a QAM modulation order. Alternatively, according to an embodiment of the present disclosure, the transmission end may encode the first portion using a first encoding method having an order of one half of the FQAM modulation order, and may encode the second portion using a second encoding method having an order of 2.

The transmission end may proceed to operation 905 to generate an FQAM symbol by combining result values of encoding corresponding to the each encoding method. For example, in the case where the information bit stream is divided into two portions, the transmission end determines a transmission bit stream to be mapped to an FQAM symbol by combining results of the first encoding and the second encoding, and maps the transmission bit stream to the FQAM symbol according to a predefined mapping rule. For example, the mapping rule may be defined as illustrated in FIG. 3 or 6.

The transmission end proceeds to operation 907 to transmit the FQAM symbol. That is, the transmission end maps the FQAM symbol to a resource allocated for communication with the reception end, up-converts the FQAM symbol to a signal in a Radio Frequency (RF) band, and then transmits the signal via at least one antenna. At this point, the transmission end may perform beamforming for giving directionality to a transmission beam.

Figure 10:
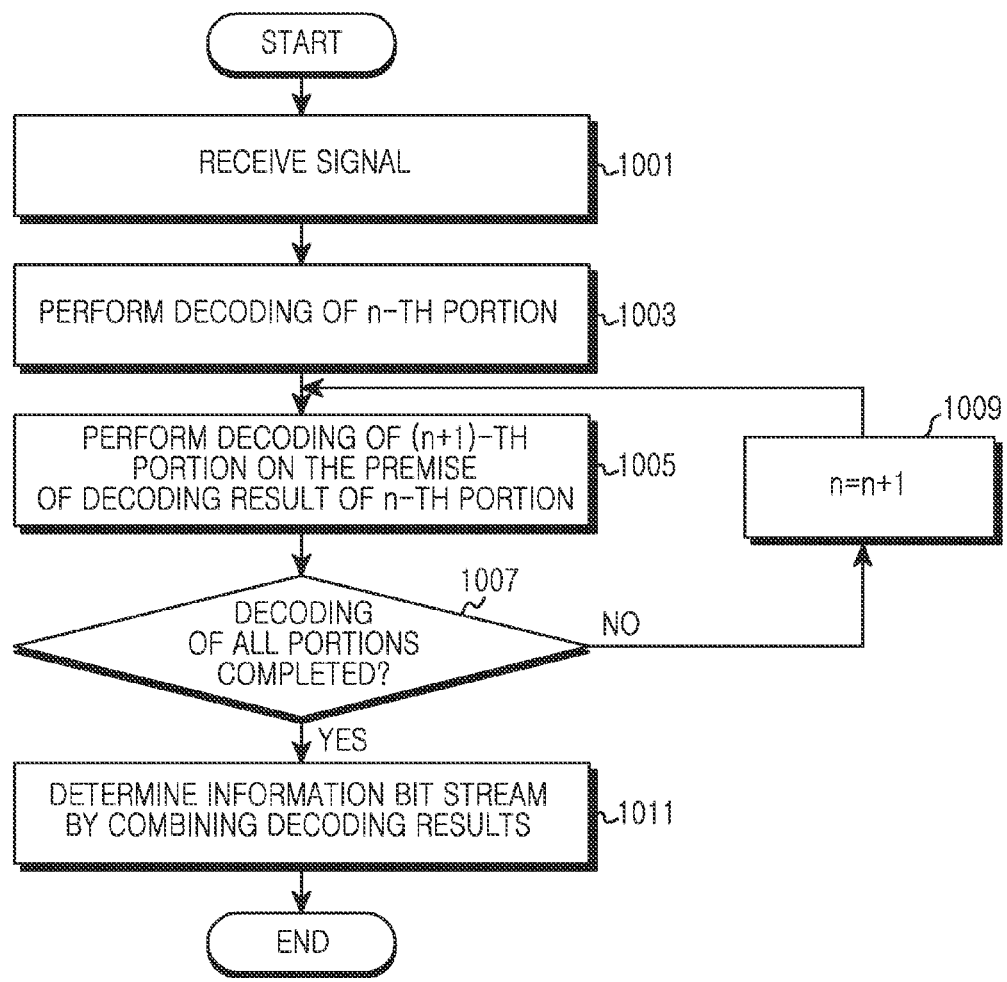
FIG. 10 is a flowchart illustrating an operating procedure of a reception end in a wireless communication system according to an embodiment of the present disclosure.

FIG. 10 is a flowchart illustrating an operating procedure of a reception end in a wireless communication system according to an embodiment of the present disclosure.

Referring to FIG. 10, the reception end receives a signal, including an FQAM symbol, from a transmission end in operation 1001. That is, the reception end receives an RF signal via at least one antenna, down-converts the RF signal to a baseband signal, and then extracts the signal from a resource allocated for communication with the transmission end. At this point, the reception end may perform beamforming for giving directionality to a reception beam.

The reception end proceeds to operation 1003 to perform decoding on an n-th portion. Here, n is initialized to 1 when the procedure of FIG. 10 starts. The n-th portion is a portion of an information bit stream, and a portion encoded in an n-th encoding method at the transmission end. That is, the reception end receives a signal which is divided into N portions at the transmission end and which is generated by encoding respective portions using different encoding methods. Accordingly, the reception end applies different decoding methods for the N portions. Here, the decoding methods may be classified, and/or distinguished, according to at least one of a decoding order, an encoding rate, an input size of corresponding encoding, and a decoding technique. In operation 1003, the reception end generates an LL vector for only the first portion, or, in other words, the LL vector that considers only the first encoding, and determines the first portion first according to the first decoding method. To generate the LL vector that considers only the first encoding, the reception end sums probabilities regarding symbol candidates where result values of the first encoding are the same and where result values of the second encoding are different. For example, the reception end may generate the LL vector that considers only the first encoding as in Equation (1).

Subsequently, the reception end proceeds to operation 1005 to perform decoding of an (n+1)-th portion on the premise of a decoding result of the n-th portion. That is, on the premise of a result value of the n-th encoding as a value corresponding to the decoding result of operation 1003, the reception end generates an LL vector for the (n+1)-th portion, or in other words, the LL vector that considers only the (n+1)-th encoding, and determines the (n+1)-th portion according to (n+1)-th decoding method. To generate the LL vector that considers only the (n+1)-th decoding, the reception end calculates a probability regarding symbol candidates where a result value of the n-th encoding has a value corresponding to the decoding result of operation 1003 and has a result value of a different (n+1)-the encoding. For example, the reception end may generate the LL vector that considers only the second encoding as in Equation (2). A value corresponding to the decoding result of operation 1003 includes a value generated by re-encoding the decoding result according to the n-th encoding. Therefore, the reception end may re-encode the result value of the decoding corresponding to the (n+1)-the decoding method according to the first encoding method.

After performing the (n+1)-th decoding, the reception end proceeds to operation 1007 to determine whether decoding of all portions has been completed. If it is determine, in operation 1007, that a portion that is not decoded exists, the reception end proceeds to operation 1009 to increase n by 1, and returns to operation 1005.

In contrast, when decoding of all portions has been completed, as determined in operation 1007, the reception end proceeds to operation 1011 to determine an information bit stream by combining decoding results of decoding of the N portions. The information bit stream denotes a bit stream before decoding at the transmission end. That is, the reception end recovers the information bit stream by inversely applying a pattern of information bit stream division at the transmission end.

Figure 11:
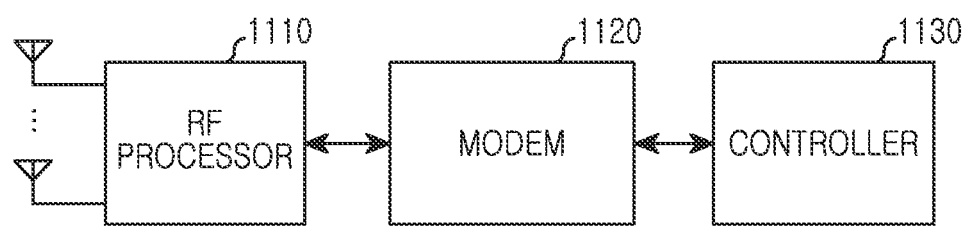
FIG. 11 is a block diagram illustrating a transmission end and a reception end in a wireless communication system according to an embodiment of the present disclosure.

FIG. 11 is a block diagram illustrating a transmission end and a reception end in a wireless communication system according to an embodiment of the present disclosure.

Referring to FIG. 11, the transmission end and the reception end may be referred to, in combination, as a 'communication apparatus'. As shown in FIG. 11, the communication apparatus includes an RF processor 1110, a modem 1120, and a controller 1130.

The RF processor 1110 performs at least one function for transmitting and/or receiving a signal via a radio channel, such as band conversion, amplification of a signal, and any other similar and/or suitable functions for transmitting and/or receiving a signal via a radio channel. That is, the RF processor 1110 up-converts a baseband signal provided from the modem 1120 to an RF band signal, and then transmits the up-converted signal via an antenna, and down-converts an RF signal received via the antenna to a baseband signal. For example, the RF processor 1110 may include an amplifier, a mixer, an oscillator, a Digital to Analog Converter (DAC), an Analog to Digital Converter (ADC), etc. Though not shown in FIG. 11, the RF processor 1110 may further include an element for performing beamforming for giving directionality to a transmission beam and/or a reception beam. The element for performing the beamforming controls the phase of a signal transmitted via each antenna.

The modem 1120 performs a conversion function between a baseband signal and a bit stream according to a physical layer standard of a system. For example, in a case of conforming to an Orthogonal Frequency Division Multiplexing (OFDM) scheme, during data transmission, the modem 1120 generates complex symbols by encoding and modulating a transmission bit stream, maps the complex symbols to subcarriers, and then configures OFDM symbols via Inverse Fast Fourier Transform (IFFT) and Cyclic Prefix (CP) insertion. Also, during data reception, the modem 1120 divides a baseband signal, provided from the RF processor 1110, on an OFDM symbol basis, recovers signals mapped to subcarriers via Fast Fourier Transform (FFT), and then recovers a reception bit stream via demodulation and decoding.

The controller 1130 controls an overall operation of the communication apparatus. For example, the controller 1130 transmits and/or receives a signal via the modem 1120 and the RF processor 1110. Also, the controller 1130 determines settings needed for demodulation and decoding performed by the modem 1120. The controller 1130 may include at least one processor, and/or any other similar and/or suitable hardware element configured to process information.

Particularly, according to an embodiment of the present disclosure, the modem 1120 performs encoding or decoding for an FQAM symbol. A specific operation of the modem 1120 for transmitting and/or receiving the FQAM symbol is described below.

In a case where a communication node operates as a transmission end, the modem 1120 operates as described below. The modem 1120 divides an information bit stream into N portions, and encodes the N portions using different encoding methods. Here, the encoding method may be classified, and/or distinguished, according to at least one of an encoding order, an encoding rate, an input size, and an encoding technique. For example, the modem 1120 may divide the information bit stream into two portions. In this case, according to an embodiment of the present disclosure, a first portion may include bits transmitted via an FSK symbol, and a second portion may include bits transmitted via a QAM symbol. According to an embodiment of the present disclosure, the information bit stream may be divided in a predefined ratio regardless of the FSK symbol and the QAM symbol. After that, the modem 1120 determines a transmission bit stream to be mapped to an FQAM symbol by combining N results of encoding, and maps the transmission bit stream to the FQAM symbol according to a predefined mapping rule. For example, the mapping rule may be defined as in FIG. 3 or 6.

In a case where the communication node operates as a reception end, the modem 1120 operates as described below. When an FQAM symbol is received from the transmission end, the modem 1120 performs decoding on N portions sequentially and step by step. That is, the modem 1120 performs decoding on an initial first portion, and performs decoding on a second portion using the decoding result of the first portion. This process is repeated up to an n-th portion. Specifically, the modem 1120 performs decoding on the first portion. For this purpose, the modem 1120 generates an LL vector for only the first portion, or in other words, the LL vector that considers only the first encoding. Specifically, the modem sums probabilities for symbol candidates where result values of the first encoding are the same and encoding result values of the rest of (N−1) portions are different. For example, in a case where the information bit stream is divided into two portions, the modem 1120 may generate the LL vector that considers only the first encoding as in Equation (1). Subsequently, the modem 1120 performs decoding on the second portion on the premise of the decoding result of the first portion. That is, on the premise of a result value of the first encoding as a value corresponding to the decoding result of operation 1003, the modem 1120 generates an LL vector for only the second portion, or in other words, the LL vector that considers only the second encoding, and determines the second portion according to the second decoding method. For example, the modem 1120 may generate the LL vector that considers only the second encoding as in Equation (2). In addition, the modem 1120 may re-encode a result value of decoding corresponding to the first decoding method according to the first encoding method. After performing the second decoding, the modem 1120 determines an information bit stream by combining results of the first decoding and the second decoding.

Figure 12:
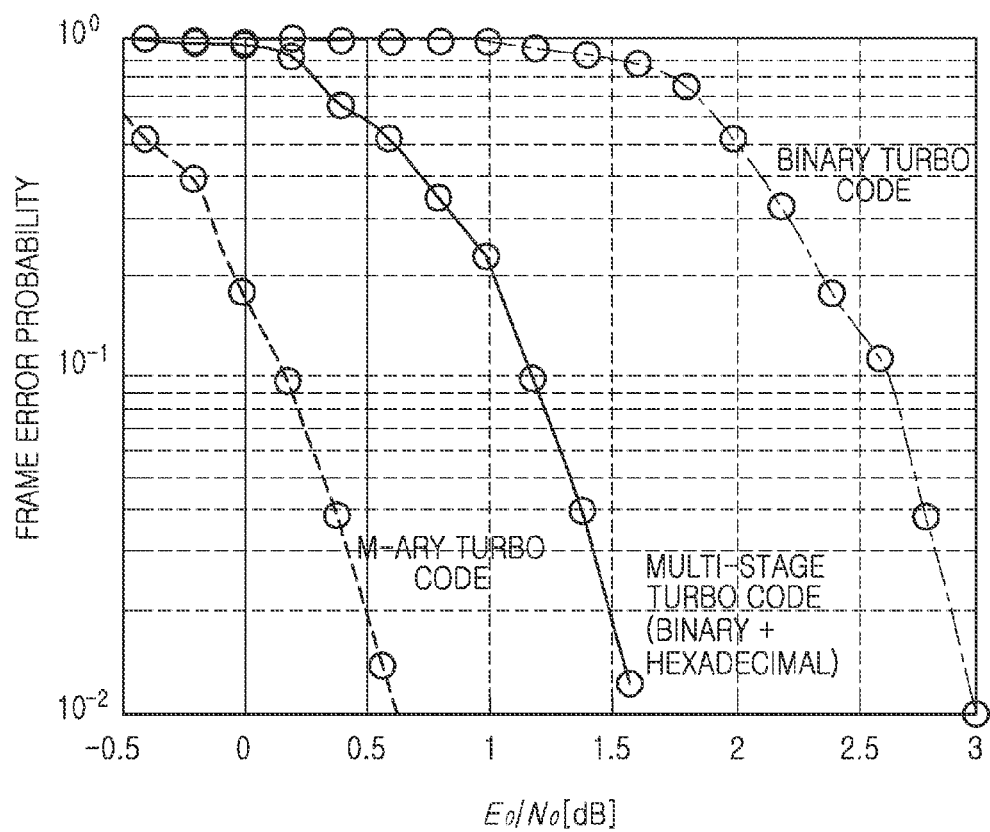
FIGS. 12 and 13 are views illustrating performance of encoding and decoding techniques according to an embodiment of the present disclosure.
Figure 13:
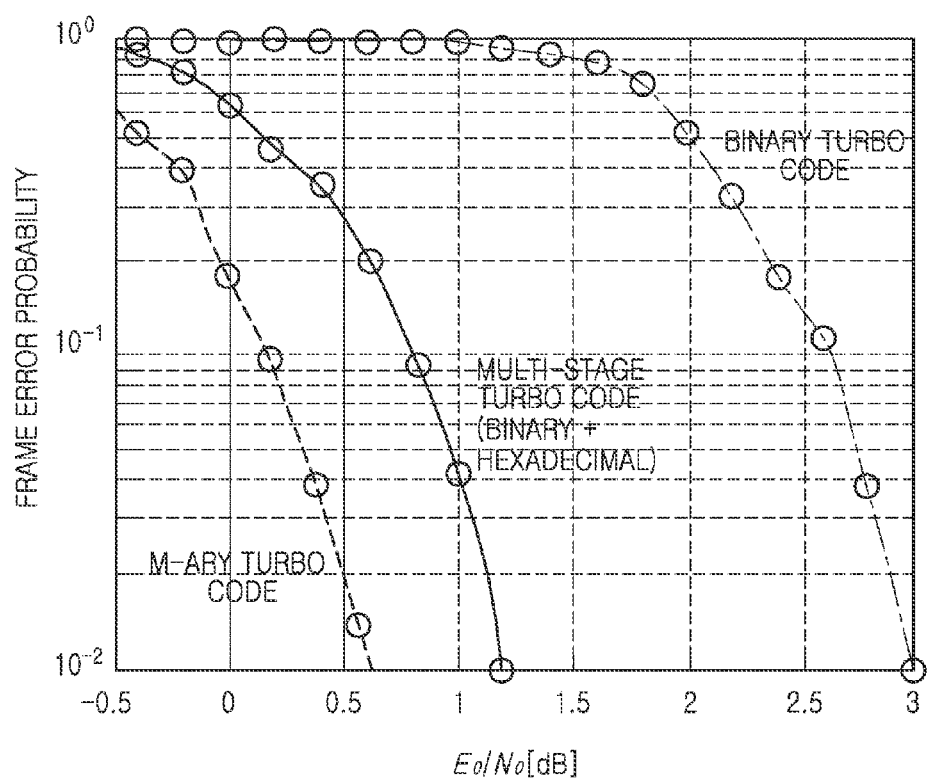

FIGS. 12 and 13 illustrate the performance of encoding and decoding techniques according to an embodiment of the present disclosure. FIGS. 12 and 13 illustrate a simulation result in the conventional art and in case of applying encoding according to the present disclosure. In the simulation, 32-FQAM that combines 16-FSK and 2-QAM has been used, and a frame length is defined as 240 bits.

FIGS. 12 and 13 are views illustrating performance of encoding and decoding techniques according to an embodiment of the present disclosure.

Referring to FIGS. 12 and 13, a frame error probability according to $E_b/N_o$ of a channel is illustrated. As shown in FIG. 12 a case of applying a mapping rule of FIG. 3 is illustrated, and, as shown in FIG. 13, a case of applying a mapping rule of FIG. 6 is illustrated.

As the related art, an M-ary turbo code and a binary turbo code have been applied, and as the present disclosure, a multi-stage encoding of a binary code and a 16-ary code has been applied.

As shown in FIGS. 12 and 13, an encoding technique of the present disclosure represents a performance closer to the M-ary code which is optimized encoding compared to a binary code.

The present disclosure may accomplish a high decoding performance at low complexity by using encoding and decoding techniques that consider a characteristic of an FQAM. That is, the present disclosure makes a characteristic of an interference signal non-Gaussian by using FQAM instead of QAM under an environment where an interference is severe, so that a total system throughput may be increased at low complexity.

Embodiments of the present invention according to the claims and description in the specification can be realized in the form of hardware, software or a combination of hardware and software.

Such software may be stored in a computer readable storage medium. The computer readable storage medium stores one or more programs (software modules), the one or more programs comprising instructions, which when executed by one or more processors in an electronic device, cause the electronic device to perform methods of the present invention.

Such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disc (CD), Digital Video Disc (DVD), magnetic disk or magnetic tape or the like. It will be appreciated that the storage devices and storage media are embodiments of machine-readable storage that are suitable for storing a program or programs comprising instructions that, when executed, implement embodiments of the present invention. Embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for operating a transmission end in a wireless communication system, the method comprising:
    encoding an information bit stream; and
    transmitting a frequency and quadrature-amplitude modulation (FQAM) symbol mapped with the encoded information bit stream,
    wherein portions of the information bit stream are encoded using different encoding schemes, and
    wherein the encoding schemes are different based on at least one of an encoding order, an encoding rate, an input size, and an encoding technique.

2. The method of claim 1, wherein an order of the FQAM symbol is equal to a product of orders of the different encoding schemes.

3. The method of claim 1, wherein the information bit stream is divided into a first portion and a second portion.

4. The method of claim 3, wherein the first portion comprises at least one bit mapped to a frequency shift keying (FSK) symbol of the FQAM symbol, and
    wherein the second portion comprises at least one bit mapped to a quadrature-amplitude modulation (QAM) symbol of the FQAM symbol.

5. The method of claim 4, further comprising:
    generating the FSK symbol by modulating first encoded values corresponding to the first portion;
    generating the QAM symbol by modulating second encoded values corresponding to the second portion; and
    generating the FQAM symbol by combining the FSK symbol and the QAM symbol.

6. The method of claim 5, wherein an encoding order for the first portion is equal to an order of the FSK symbol, and
    wherein an encoding order for the second portion is equal to an order of the QAM symbol.

7. The method of claim 1, further comprising:
    determining a transmission bit stream mapped to the FQAM symbol by combining first encoded values corresponding to the first portion and second encoded values corresponding the second portion; and
    mapping the transmission bit stream to the FQAM based on a mapping rule.

8. The method of claim 7, wherein a bit ratio of the first portion and the second portion is $\log_2$ {an encoding order for the first portion}: $\log_2$ {an encoding order for the second portion}.

9. The method of claim 8, wherein the encoding order for the first portion is equal to half of an order of the FQAM symbol, and
    wherein the encoding order for the second portion is 2.

10. A method for operating a reception end in a wireless communication system, the method comprising:
    receiving, from a transmission end, a frequency and quadrature-amplitude modulation (FQAM) symbol mapped with an encoded information bit stream; and
    decoding the encoded information bit stream,
    wherein portions of the encoded information bit stream are decoded using different encoding schemes, and
    wherein the encoding schemes are different to based on at least one of an encoding order, an encoding rate, an input size, and an encoding technique.

11. The method of claim 10, wherein the decoding of the encoded portions using different encoding schemes comprises:
    decoding a first portion of the encoded portions based on a first decoding scheme based on the FQAM symbol; and
    decoding a second portion of the encoded portions based on a second decoding scheme based on the FQAM symbol and decoded values of the first portion.

12. The method of claim 10, wherein an order of the FQAM symbol is equal to a product of encoding orders of portions of the different encoding schemes.

13. The method of claim 11, wherein a decoding order for the first portion is equal to an order of a frequency shift keying (FSK) symbol of the FQAM symbol, and wherein a decoding order for the second portion is equal to an order of a quadrature-amplitude modulation (QAM) symbol of the FQAM symbol.

14. The method of claim 11, wherein a decoding order for the first portion is equal to half of an order of the FQAM symbol, and
wherein a decoding order for the second portion is 2.

15. The method of claim 11, wherein the decoding of the first portion comprises:
generating a log likelihood (LL) vector that considers only a first encoding scheme applied to the first portion, and
wherein the generating of the LL vector comprises:
summing probabilities for symbol candidates where first encoded values by the first encoding scheme are equal to each other and second encoded values by a second encoding scheme applied to the second portion are different from each other.

16. The method of claim 11, wherein the decoding of the second portion comprises:
generating a log likelihood (LL) vector that considers only a second encoding scheme applied to the second portion, and
wherein the generating of the LL vector comprises:
calculating probabilities for symbol candidates where first encoded values by a first encoding scheme are identical to values corresponding to the decoded values of the first portion, and second encoded values by the second encoding scheme are different from each other.

17. The method of claim 16, wherein the values corresponding to the decoded values of the first portion comprise values obtained by re-encoding the decoded values of the first portion.

18. An apparatus of a transmission end in a wireless communication system, the apparatus comprising:
a modem configured to encode an information bit stream; and
a transmitter configured to transmit a frequency and quadrature-amplitude modulation (FQAM) symbol mapped with the encoded information bit stream,
wherein portions of the encoded information bit stream are encoded using different encoding schemes, and
wherein the encoding schemes are different based on at least one of an encoding order, an encoding rate, an input size, and an encoding technique.

19. The apparatus of claim 18, wherein an order of the FQAM symbol is equal to a product of encoding orders of the different encoding schemes.

20. The apparatus of claim 18, wherein the information bit stream is divided into a first portion and a second portion.

21. The apparatus of claim 20, wherein the first portion comprises at least one bit mapped to a frequency shift keying (FSK) symbol of the FQAM symbol, and
wherein the second portion comprises at least one bit mapped to a quadrature-amplitude modulation (QAM) symbol of the FQAM symbol.

22. The apparatus of claim 21, wherein the modem is further configured to:
generate the FSK symbol by modulating first encoded values corresponding to the first portion,
generate the QAM symbol by modulating second encoded values corresponding to the second portion, and
generate the FQAM symbol by combining the FSK symbol and the QAM symbol.

23. The apparatus of claim 22, wherein an encoding order for the first portion is equal to an order of the FSK symbol, and
wherein an encoding order for the second portion is equal to an order of the QAM symbol.

24. The apparatus of claim 18, wherein the modem is further configured to:
determine a transmission bit stream mapped to the FQAM symbol by combining first encoded values corresponding to the first portion and second encoded values corresponding to the second portion, and
map the transmission bit stream to the FQAM based on a mapping rule.

25. The apparatus of claim 24, wherein a bit ratio of the first portion and the second portion is $\log_2$ {an encoding order for the first portion}: $\log_2$ {an encoding order for the second portion}.

26. The apparatus of claim 25, wherein the encoding order for the first portion is equal to half of an order of the FQAM symbol, and
wherein the encoding order for the second portion is 2.

27. An apparatus of a reception end in a wireless communication system, the apparatus comprising:
a receiver configured to receive, from a transmission end, a frequency and quadrature-amplitude modulation (FQAM) symbol mapped with an encoded information bit stream; and
a modem configured to decode the encoded information bit stream,
wherein portions of the encoded information bit stream are decoded using different encoding schemes, and
wherein the encoding schemes are different based on at least one of an encoding order, an encoding rate, an input size, and an encoding technique.

28. The apparatus of claim 27, wherein the modem is further configured to:
decode a first portion of the encoded portions based on a first decoding scheme based on the FQAM, and
decode a second portion of the encoded portions based on a second decoding scheme based on the FQAM symbol and the decoded values of the first portion.

29. The apparatus of claim 27, wherein an order of the FQAM symbol is equal to a product of encoding orders of the different decoding schemes.

30. The apparatus of claim 28, wherein a decoding order for the first portion is equal to an order of a frequency shift keying (FSK) symbol of the FQAM symbol, and
wherein a decoding order for the second portion is equal to an order of a quadrature-amplitude modulation (QAM) symbol of the FQAM symbol.

31. The apparatus of claim 28, wherein a decoding order for the first portion is equal to half of an order of the FQAM symbol, and
wherein a decoding order for the second portion is 2.

32. The apparatus of claim 28, wherein the modem is further configured to generate a log likelihood (LL) vector that considers only a first encoding scheme applied to the first portion, and
wherein the modem is configured to generate the LL vector by summing probabilities for symbol candidates where first encoded values by the first encoding scheme are equal to each other, and second encoded values by a second encoding scheme applied to the second portion are different from each other.

33. The apparatus of claim 28, wherein the modem is further configured to generate a log likelihood (LL) vector that considers only the second encoding scheme applied to the second portion, and
wherein the modem is configured to generate the LL vector by calculating probabilities for symbol candidates where first encoded values by the first encoding scheme are identical to values corresponding to the decoded values of the first portion, and second encoded values by the second encoding scheme are different from each other.

34. The apparatus of claim 33, wherein the values corresponding to the decoded values of the first portion comprise values obtained by re-encoding the decoded values of the first portion.

* * * * *